(12) United States Patent
Boutet et al.

(10) Patent No.: US 6,987,280 B2
(45) Date of Patent: Jan. 17, 2006

(54) COLLECTOR DESIGN FOR COMPUTED RADIOGRAPHY

(75) Inventors: John C. Boutet, Rochester, NY (US); Michael B. Brandt, Walworth, NY (US); Andrew M. Dziel, Rochester, NY (US); Anna L. Hrycin, Rochester, NY (US); James R. Kircher, Mendon, NY (US); Christopher M. Muir, Rochester, NY (US); Michael K. Rogers, Mendon, NY (US); Thomas S. Albrecht, Canandaigua, NY (US)

(73) Assignee: Eastman Kodak Company, Rochester, NY (US)

( * ) Notice: Subject to any disclaimer, the term of this patent is extended or adjusted under 35 U.S.C. 154(b) by 95 days.

(21) Appl. No.: 10/366,999

(22) Filed: Feb. 14, 2003

(65) Prior Publication Data

US 2004/0159806 A1    Aug. 19, 2004

(51) Int. Cl.
    *G01J 1/00* (2006.01)
(52) U.S. Cl. .................................. 250/586; 250/484.1
(58) Field of Classification Search ................ 250/586, 250/484.1, 585
    See application file for complete search history.

(56) References Cited

U.S. PATENT DOCUMENTS

| | | | |
|---|---|---|---|
| RE31,847 E | | 3/1985 | Luckey |
| 4,743,759 A | | 5/1988 | Boutet |
| 4,775,791 A | * | 10/1988 | Owen et al. ................ 250/586 |
| 4,776,696 A | * | 10/1988 | Hettrick et al. ............. 356/328 |
| 4,970,394 A | * | 11/1990 | Boutet et al. ............... 250/586 |
| 5,105,079 A | * | 4/1992 | Boutet et al. ............... 250/586 |
| 5,134,290 A | * | 7/1992 | Boutet et al. ............... 250/586 |
| 5,138,161 A | * | 8/1992 | Miyagawa et al. .......... 250/586 |
| 5,140,160 A | * | 8/1992 | Boutet et al. ............... 250/586 |
| 5,151,592 A | | 9/1992 | Boutet et al. |
| 5,506,417 A | | 4/1996 | Brandt |
| 5,541,421 A | * | 7/1996 | Brandt et al. ............... 250/586 |

(Continued)

FOREIGN PATENT DOCUMENTS

EP          0715315 A2    6/1996

*Primary Examiner*—Otilia Gabor
(74) *Attorney, Agent, or Firm*—William F. Noval

(57) ABSTRACT

A light collector and detector for collecting and detecting light emitted, reflected or transmitted by a scanned information medium, comprising: a planar mirror assembly for extending the width of a scanned information medium and for disposition substantially perpendicular thereto, the planar mirror assembly having a lower edge adjacent to the scanned medium and an upper edge spaced from the lower edge; first and second pyramidal mirrors located side by side facing the planar mirror, the pyramidal mirrors having respective upper edges spaced from the upper edge of the planar mirror and respective lower edges spaced from the lower edge of the planar mirror, thereby to form aligned slots for the passage of a scanning beam of light to a medium to be scanned and for allowing light emitted by, reflected from, or transmitted by the scanned medium to enter the collector; wherein the first pyramidal mirror has a first aperture in an apex region thereof and wherein the second pyramidal mirror has a second aperture in an apex region thereof; a first photodetector having a light receiving face coextensive with the aperture of the first pyramidal mirror; a second photodetector having a lightreceiving face coextensive with the aperture of the second pyramidal mirror; wherein light from the scanned medium and reflected by the collector mirrors are received by the light receiving faces of the first and second photodetectors which generate electrical signals in response thereto.

14 Claims, 14 Drawing Sheets

U.S. PATENT DOCUMENTS 5,598,008 A * 1/1997 Livoni .................. 250/586
2004/0159804 A1 * 8/2004 Boutet et al. ............ 250/586
2004/0159805 A1 * 8/2004 Boutet et al. ............ 250/586

* cited by examiner

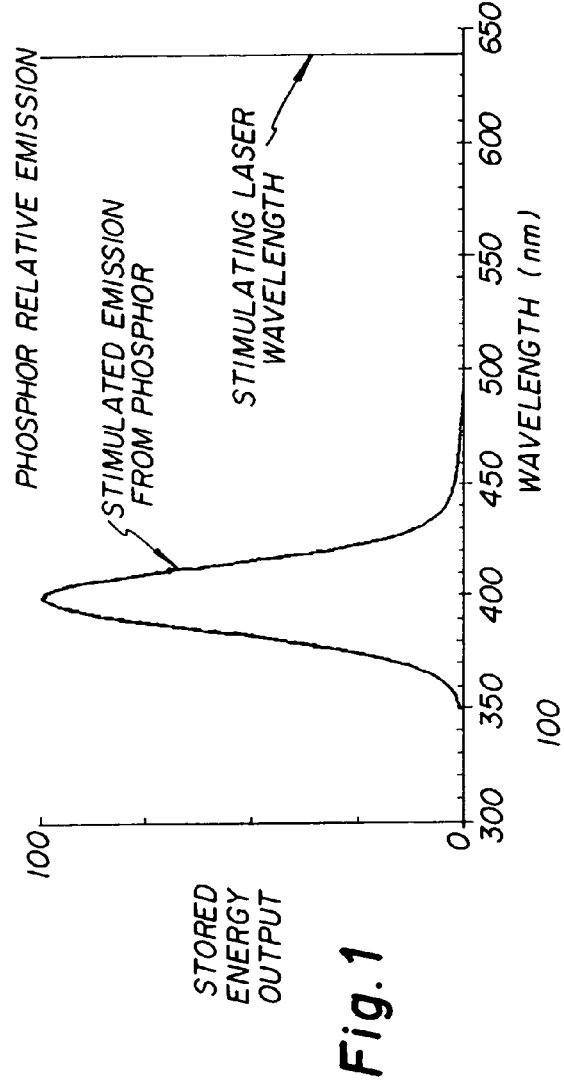
Fig. 1
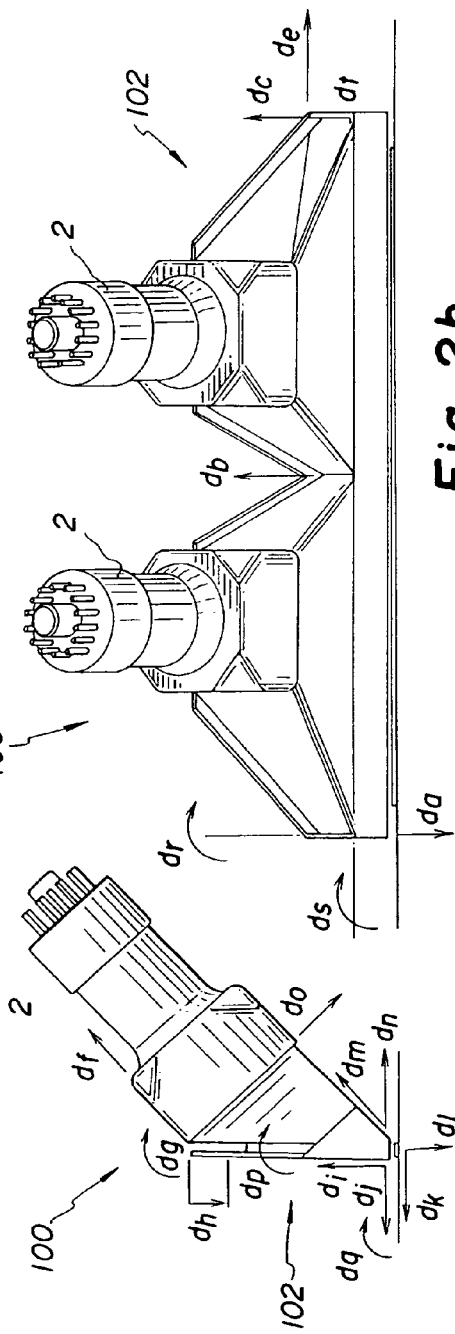
Fig. 2a
Fig. 2b

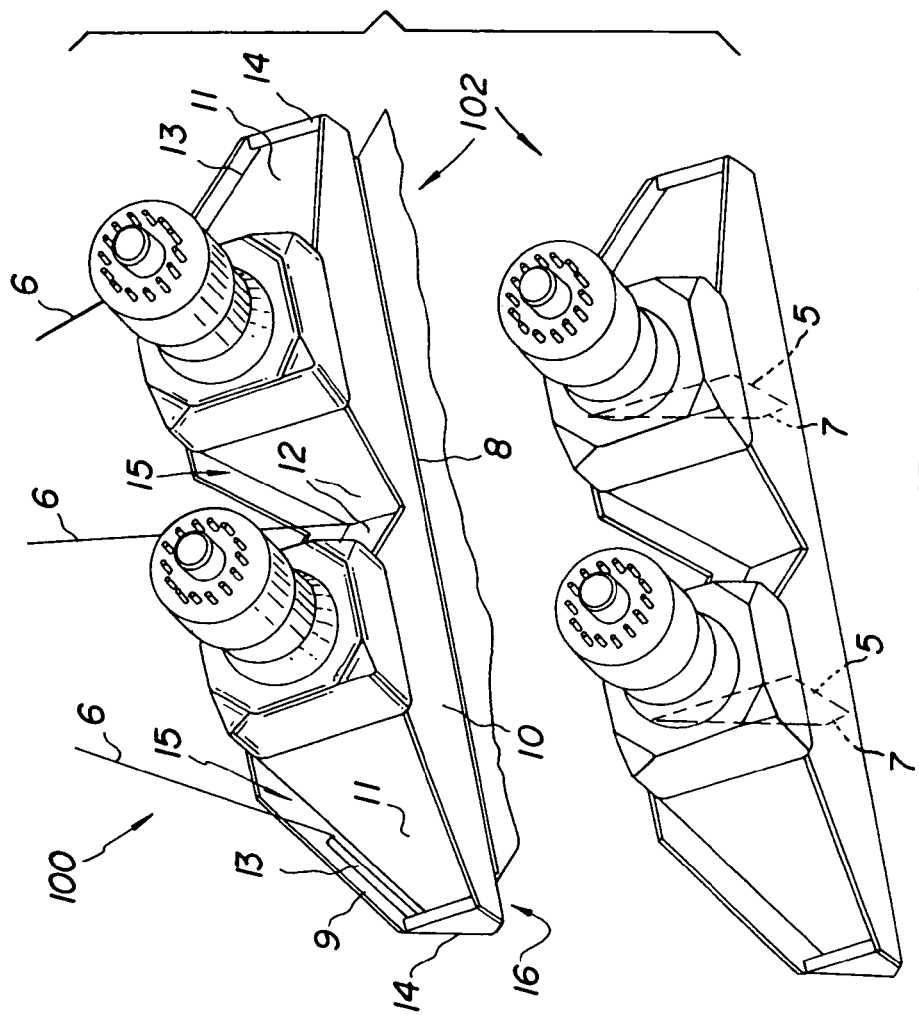
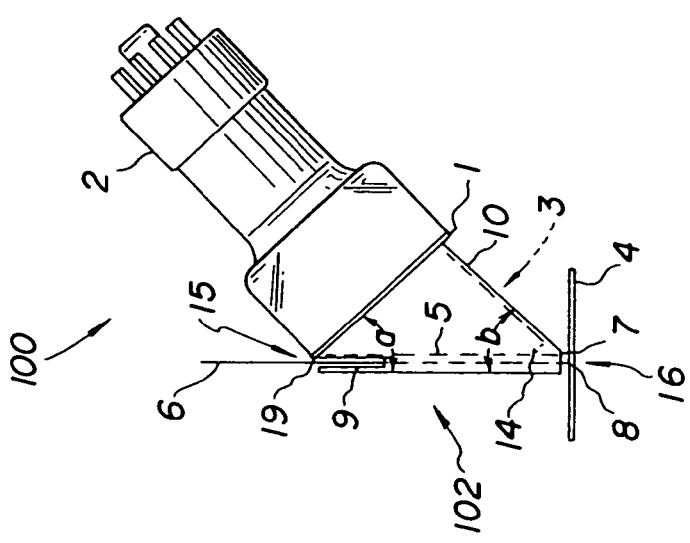

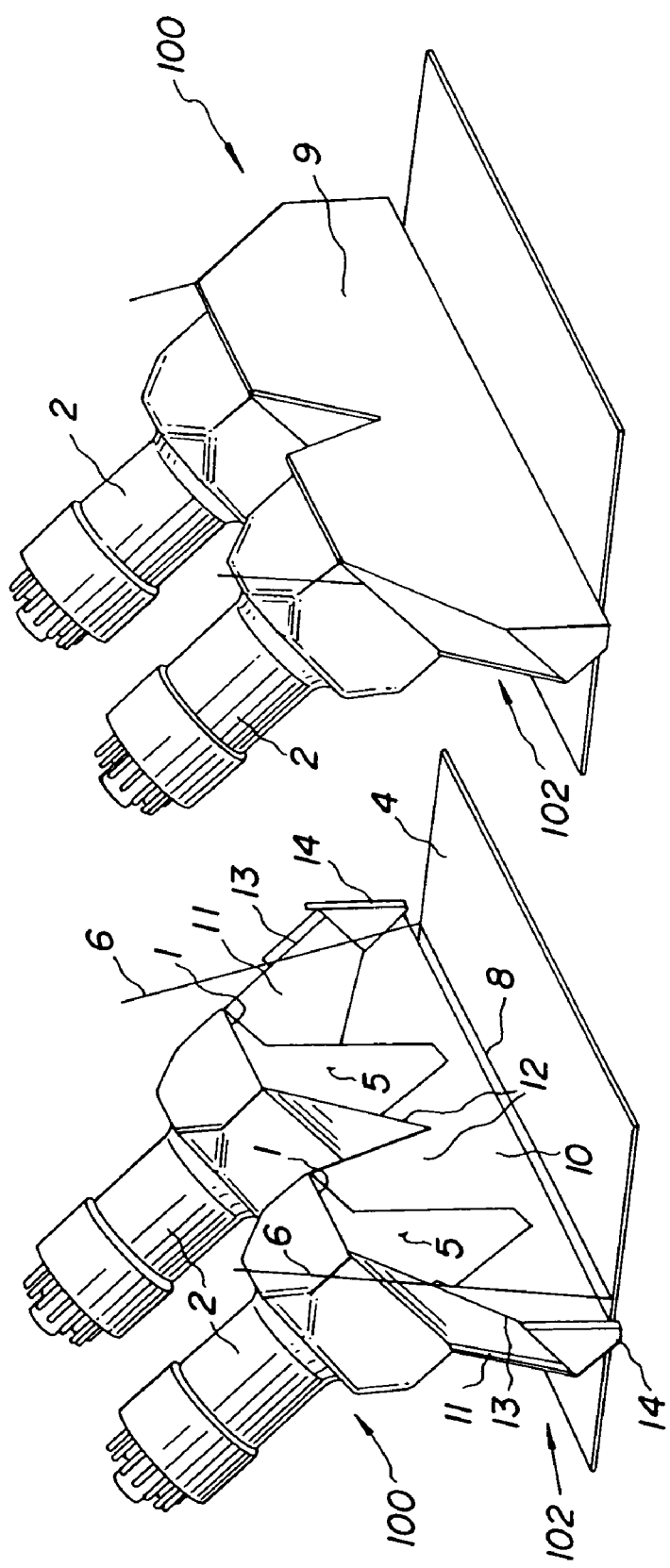

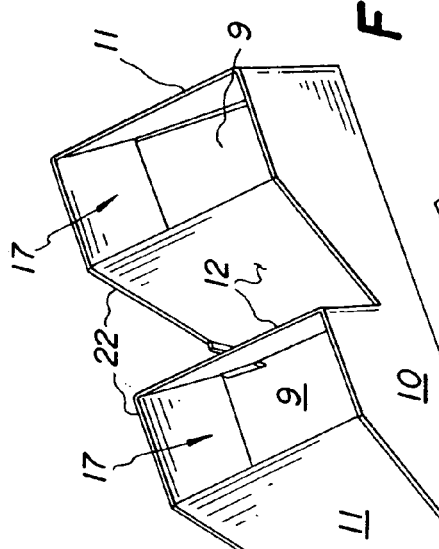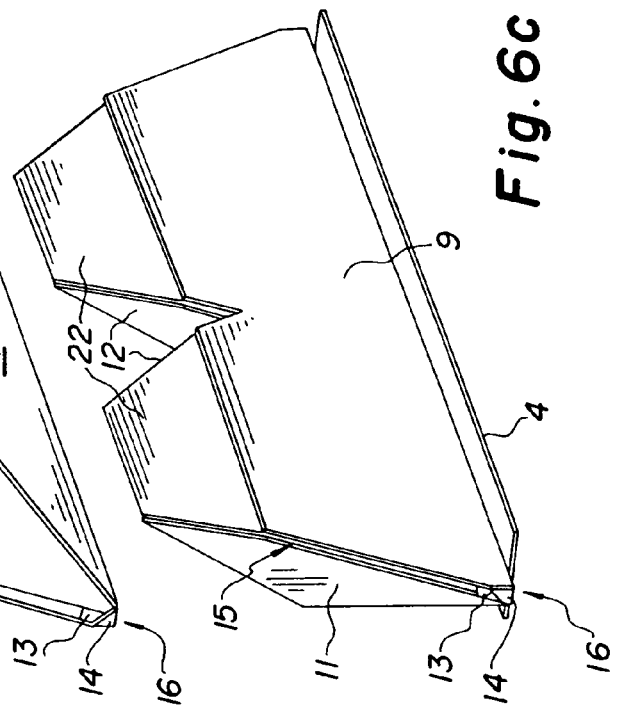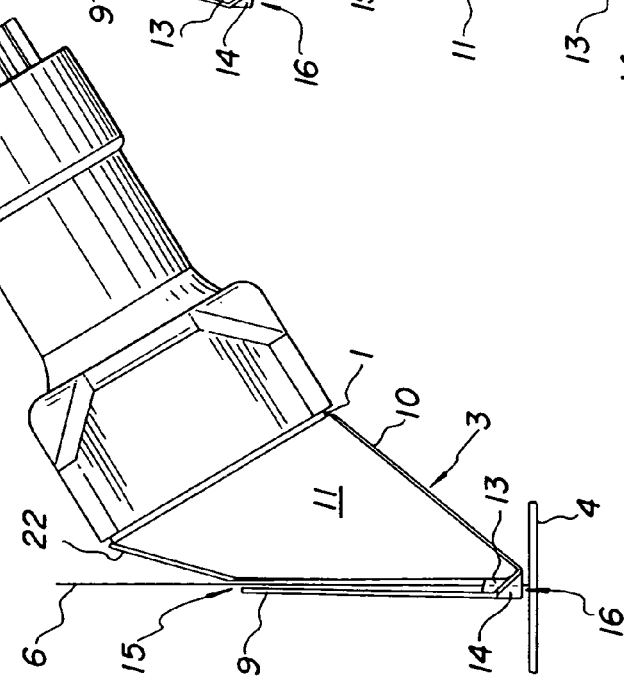

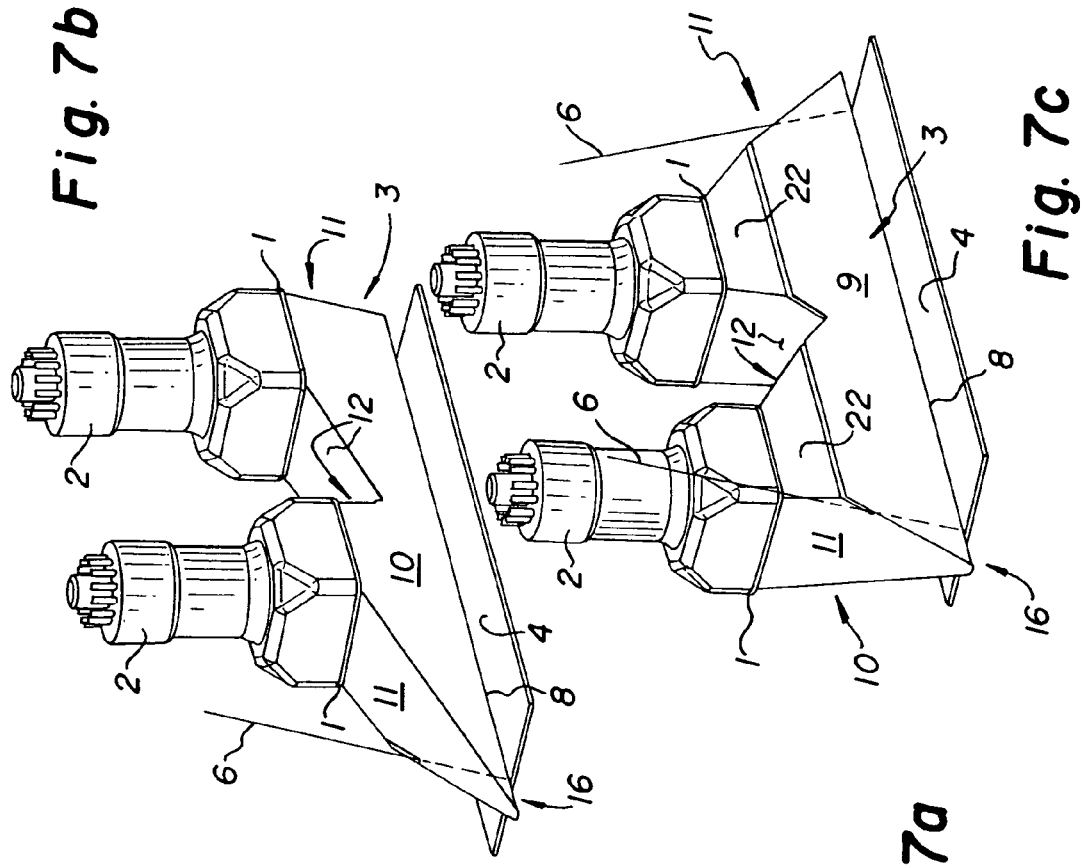
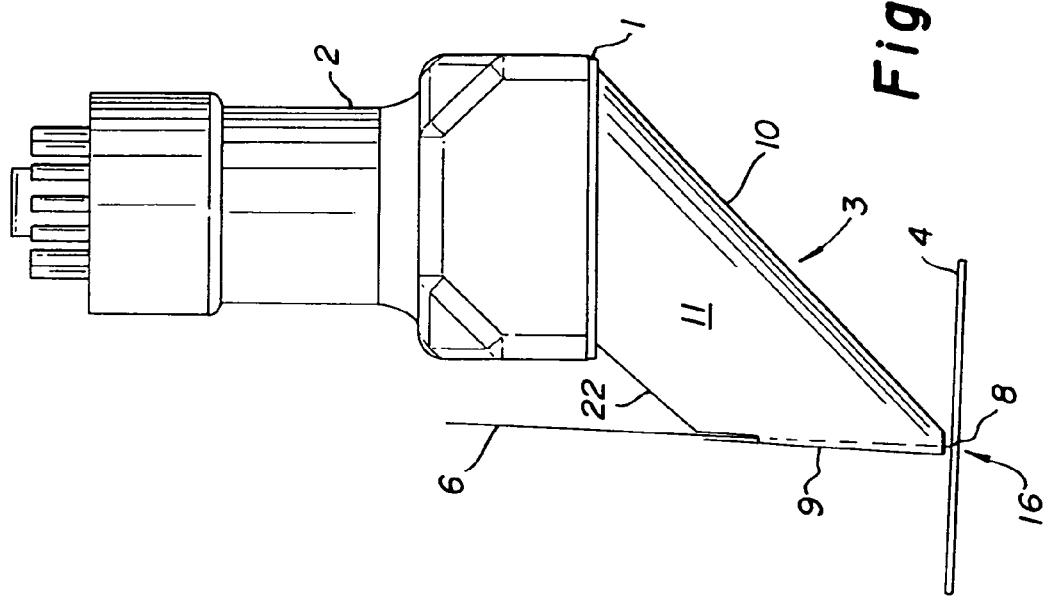

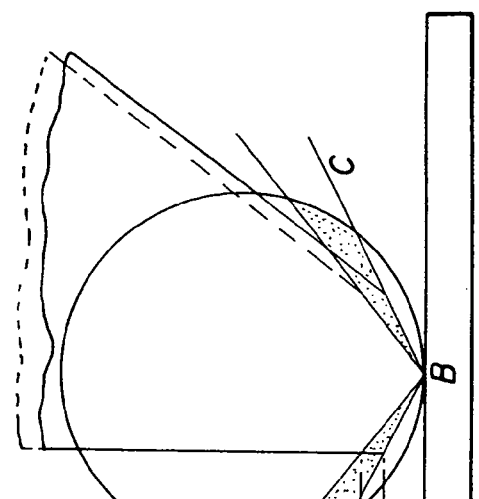
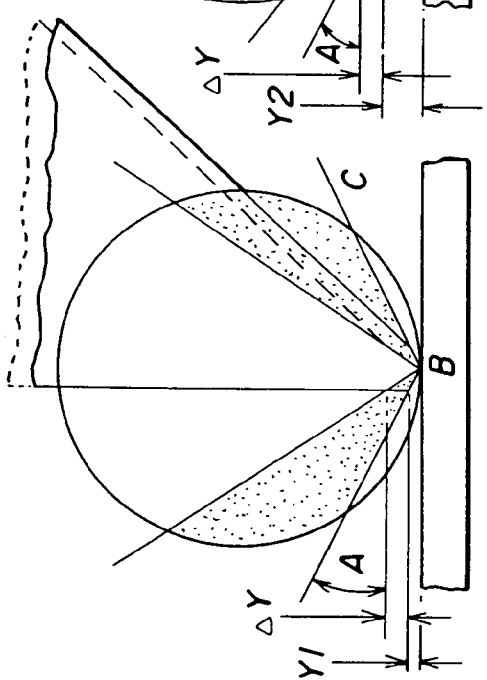
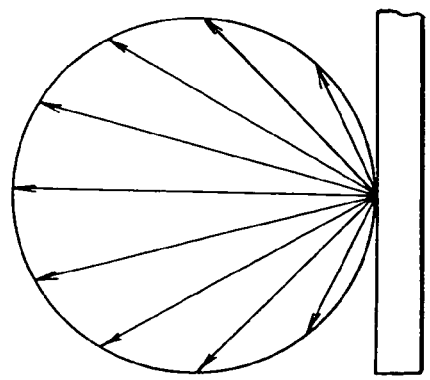
Fig. 8c
Fig. 8b
Fig. 8a

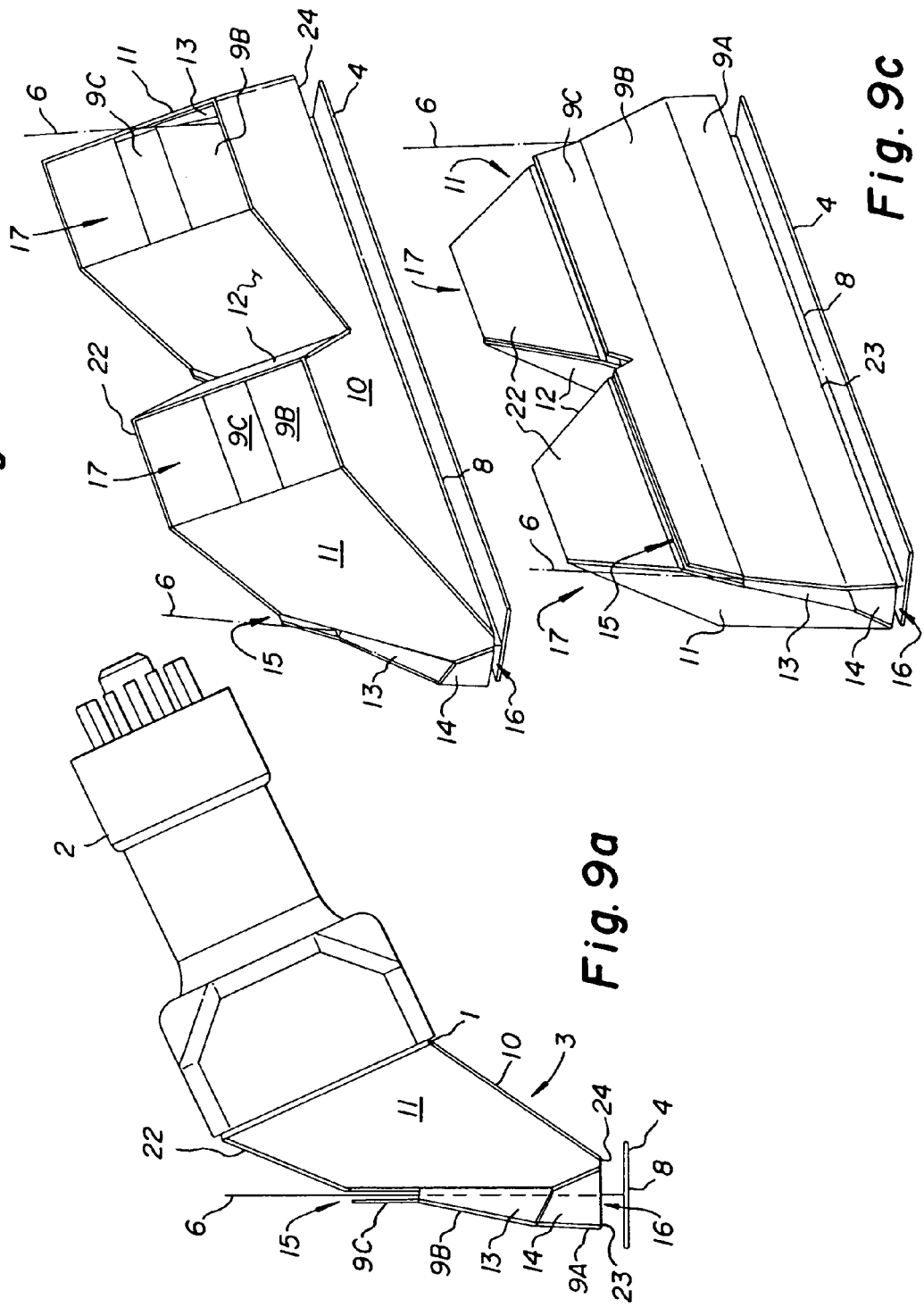

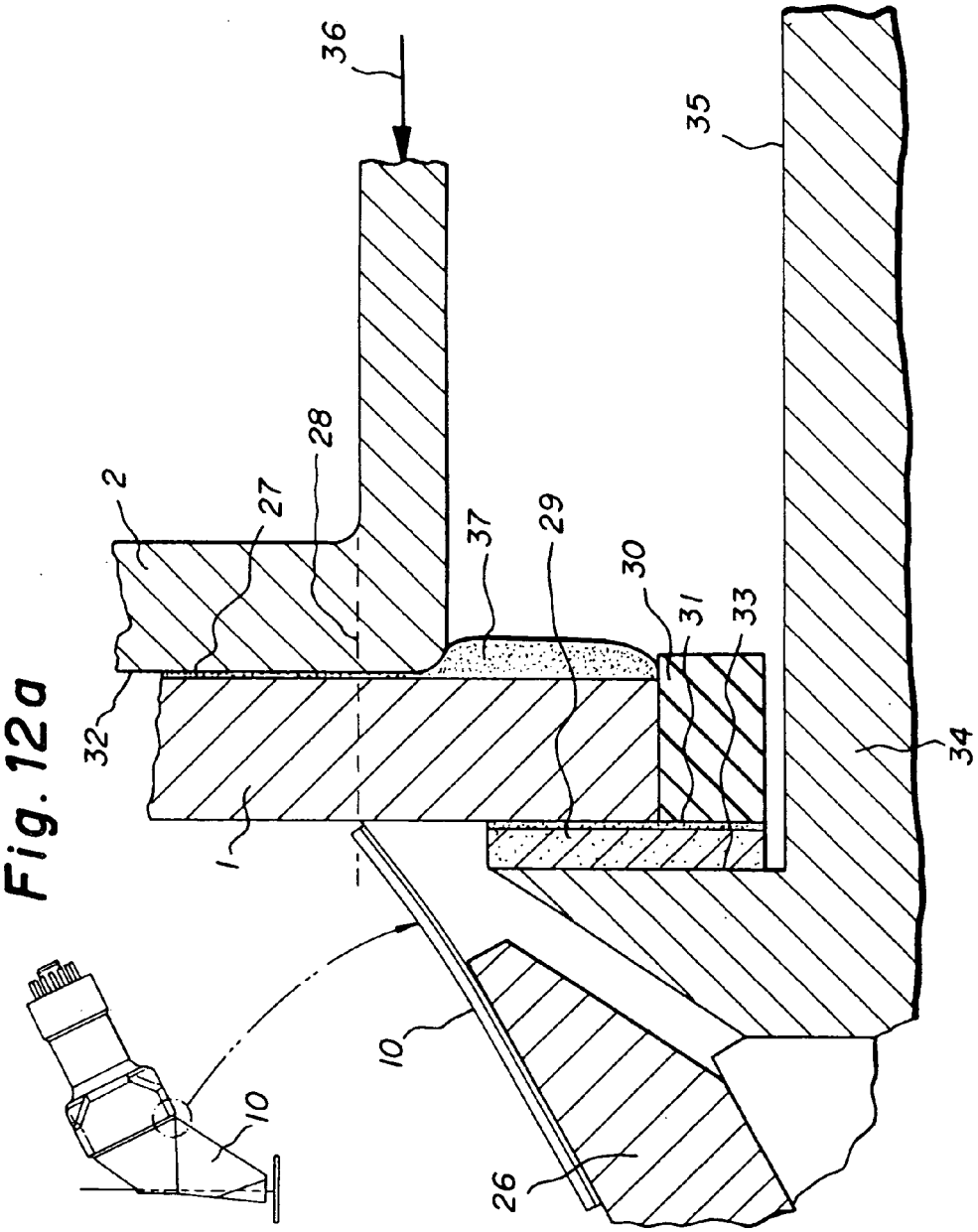

COLLECTOR DESIGN FOR COMPUTED RADIOGRAPHY

FIELD OF THE INVENTION

This invention relates in general to a computed radiography (CR) apparatus for reading out the image stored in a photostimulable phosphor image recording medium. More particularly, this invention relates to apparatus for collecting and detecting the radiation emitted from the photostimulable phosphor in response to interrogation by stimulating radiation wherein flare is minimized.

BACKGROUND OF THE INVENTION

In standard medical x-rays a sheet of film is placed in contact with one or two phosphor sheets. The x-rays cause the phosphor to fluoresce, thereby exposing the film. With this method it is critical to insure appropriate exposure for the desired film density. For wider exposure latitude computed radiography utilizes a storage phosphor material, as described in U.S. Pat. No. Re. 31,847, reissued Mar. 12, 1985, inventor Luckey. Part of the absorbed x-ray energy in a storage phosphor causes instantaneous fluorescence, but a significant part is stored in the phosphor and is not emitted as light until this type of media is discharged. The media is discharged by scanning with a relatively long wavelength beam of stimulating radiation, such as red or infrared light. The red stimulating light excites the phosphor causing the release of stored energy as short wavelength blue or violet emitted light. The amount of short wavelength emitted light from each pixel area of the phosphor surface is measured and represents the quantity of x-ray exposure, if the red stimulating energy is constant and illuminating only the pixel being read. Most of the red stimulating light diffusely reflects off the phosphor surface and must be prevented from reimpinging elsewhere on the phosphor where it could discharge energy as blue "flare" light from areas other than the pixel being read. To optimize the signal-to-noise ratio of the imaging system, it is desirable to collect as much of the emitted light as possible and to direct it to the photodetector. John C. Boutet disclosed a V-roof mirror collector in U.S. Pat. No. 4,743,759, issued May 10, 1988, that utilized top and bottom 90° roof mirrors to produce a high efficiency low flare collector using two large diameter PMT's. That design relied on unique properties of 90° roof mirrors, the use of narrow top and bottom slots and very close spacing to the phosphor to achieve high efficiency and low flare. Later he disclosed a Split V-roof mirror collector in U.S. Pat. No. 5,105,079, issued Apr. 14, 1992, that reduced the cost of the original design by utilizing only one PMT. That design split the original 90° roof mirrors in half and reflected the resulting 45° mirrors on themselves with a large vertical mirror to benefit from the properties of 90° roof mirrors. John C. Boutet and Michael B. Brandt went on to disclose in U.S. Pat. No. 5,151,592, issued Sep. 29, 1992, the possible use of second-surface reflector-coated blue filters or other means to produce blue mirrors that reflect blue and do not reflect red light to control flare in CR light collectors. One problem they mention about such blue mirrors is that they generally have some blue absorption that reduces blue light collection efficiency.

For achieving high collection efficiency the mirror reflectivity should be as close to 100% as possible. FIG. 1 shows that the emission spectra of the blue stored energy wavelengths from a typical storage phosphor have a 350 nm to 450 nm distribution peaking at 400 nm and the stimulating radiation is typically a narrow laser output that in this case is at 639 nm.

Uncoated aluminum generally provides around 90% reflectivity in the blue emission range. The reflectivity of aluminum mirrors can be significantly improved with coatings if a single wavelength and reflection angle are involved. In CR light collectors however the coating must work for a wavelength range of a 100 nm and a reflection angles range from near 0 degrees to near 90 degrees from normal. By enhancing the aluminum coating with 4 to 6 coating layers the average reflectivity can be enhanced to around 95%. Blue filter mirrors produced by aluminizing the back face of a blue filter will generally yield reflectivities below 90%. To avoid the efficiency losses produced by filter mirrors, collector designs have generally controlled flare by optimizing collector geometry for low flare and high efficiency. This has restricted the design space one can explore for high efficiency.

The width of the plate being scanned and the geometry of the collector determine the space envelope that a collector design requires. The Split V-roof design described in U.S. Pat. No. 5,105,079 requires that the PMT extend out past the side of the phosphor plate thereby increasing the required footprint of most scanner designs utilizing that collector. U.S. Pat. No. 5,134,290, issued Jul. 28, 1992, inventors Boutet et al., and U.S. Pat. No. 5,140,160, issued Aug. 18, 1992, inventors Boutet et al. describe pyramidal mirror collectors which position a single mirror centrally in a collector design that could permit a smaller footprint scanner. All of these collector designs require a large size PMT face in order to achieve good collection efficiency. Such large PMT's are generally expensive. Also the collection efficiency of these designs varied significantly across the width of the phosphor and the width of the collection slot in the page-scan direction had to be narrow in order to keep flare at an acceptable limit.

It is desirable for a collector design to provide a reasonably uniform and smooth collection efficiency profile across the width of the collector so that the profile can be easily and repeatedly corrected out with a look-up table. Sharp discontinuities in a collection profile are likely to shift slightly over time with temperature or other factors and the correction profile, if not updated, will then introduce visible sharp streaks in the resulting image. Michael B. Brandt discloses an efficient light collector with a uniform and smooth profile in U.S. Pat. No. 5,506,417, issued Apr. 9, 1996. This design utilizes five 3" square-faced PMT's.

SUMMARY OF THE INVENTION

According to the present invention, there is provided a solution to the problems discussed above.

According to a feature of the present invention, there is provided a light collector and detector apparatus for collecting and detecting light emitted, reflected or transmitted by a scanned information medium, comprising:

a planar mirror assembly for extending the width of a scanned information medium and for disposition substantially perpendicular thereto, said planar mirror assembly having a lower edge adjacent to the scanned medium and an upper edge spaced from the lower edge;

first and second pyramidal mirrors located side by side facing said planar mirror, said pyramidal mirrors having respective upper edges spaced from said upper edge of said planar mirror and respective lower edges spaced from said lower edge of said planar mirror, thereby to form aligned upper and lower slots for the passage of a scanning beam of light to a medium to be scanned and for allowing light emitted by, reflected from, or transmitted by the scanned medium to enter the collector;

wherein said first pyramidal mirror has a first aperture in an apex region thereof and wherein said second pyramidal mirror has a second aperture in an apex region thereof;

a first photodetector having a light receiving face coextensive with said aperture of said first pyramidal mirror;

a second photodetector having a lightreceiving face coextensive with said aperture of said second pyramidal mirror;

wherein light from said scanned medium and reflected by said collector mirrors are received by said light receiving faces of said first and second photodetectors which generate electrical signals in response thereto.

ADVANTAGEOUS EFFECT OF THE INVENTION

The invention has the following advantages.

1. A high efficiency, low flare 2 PMT light collector is used low cost computed radiography systems.

2. The design reduces the cost of the overall CR light collector system by reducing the PMT count and simplifying associated circuitry and support components while maintaining the collection efficiency, low flare, and uniform collection profile enjoyed with a previous 5 PMT design.

3. The new collector fits in.

4. A large-entrance-aperture mirror-chamber directs the collected light to two 3" square PMT's and maintains good collection efficiency at a variety of elevations above the phosphor. The large mouth design permits efficient light collection at elevations above the phosphor that permit plate extraction mechanism clearance without the use of moving parts such as are used in a previous 5 PMT design.

5. Specially designed dielectric mirrors, which reflect the emitted blue light wavelength range efficiently but do not reflect red stimulating light well, keep flare low while maximizing efficiency.

BRIEF DESCRIPTION OF THE DRAWINGS

FIG. 1 is a graphical view showing relative phosphor stimulating and emission wavelengths.

FIGS. 2a and 2b are respective diagrammatic elevational and perspective views of an embodiment of the present invention.

FIGS. 3a–3d are diagrammatic views showing aspects of the embodiment of FIGS. 2a and 2b.

FIGS. 6a, 6b, and 6c are diagrammatic views of another embodiments of the present invention.

FIGS. 7a, 7b and 7c are diagrammatic views of another embodiment of the present invention.

FIGS. 8a, 8b, and 8c are diagrammatic views respectively illustrating Lambertian Energy Output From Phosphor, Narrow Mouth Collector Elevation Sensitivity, and Wide Mouth Collector Elevation Sensitivity.

FIGS. 9a, 9b, and 9c are diagrammatic views of another embodiment of the present invention.

FIGS. 12 and 13 are diagrammatic views showing mounting details of components of the embodiment of the invention of FIGS. 10a–10c.

DETAILED DESCRIPTION OF THE INVENTION

Figure 4:
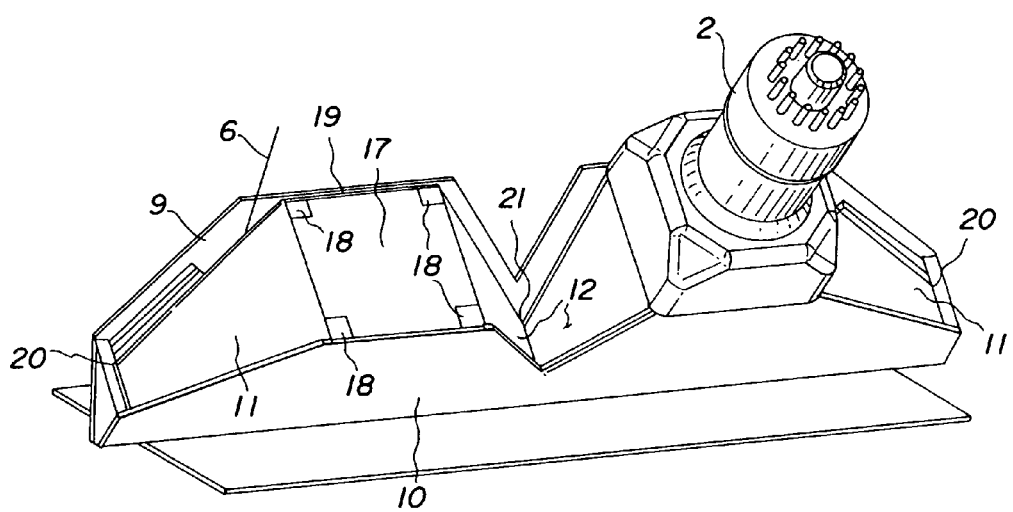
FIG. 4 is a diagrammatic view illustrating the PMT filter aperture of the embodiment of FIGS. 2a, 2b.

In general, according to the present invention there is provided a low cost collector having high efficiency, low flare, a uniform and smooth collection profile and a wide collection aperture for collecting emitted radiation.

The collector of the present invention will be described as incorporated into a storage phosphor imaging system. In such a system, a storage phosphor which stores a latent x-ray image (such as of an anatomical part of a patient) is scanned by a laser beam which is swept across the storage phosphor in a line scan as it is transported in a page scan direction. The storage phosphor is thus scanned in a raster pattern. The storage phosphor is scanned with stimulating light of one wavelength, such as red, and emits light, representative of the stored image, at another wavelength, such as blue. The collector collects the emitted light and directs it to one or more photodetectors.

According to an embodiment of the present invention shown in FIGS. 2a, b and FIGS. 3a–3d, collector 100 includes a pair of photodetectors (PMTs) (2) mounted to a mirror assembly 102 including normal planar mirror (9) and pyramidal mirror chambers (3). The parameters $d_a$–$d_r$ shown in FIGS. 2a, b illustrate geometric variables that can be altered to obtain the best collector embodiment that would meet given space constraints.

To improve collection, the blue filters (1) that cover the face of each photodetector PMT (2) are cemented in place with index matching optical cement to eliminate Fresnel reflections at the filter-air-PMT interfaces. Filters (1) pass emitted blue light but reject stimulating red light. In this design some reflected red rays can bounce from one side of the PMT to the other inside each of the two pyramidal mirror chamber (3) and get back to the phosphor (4) without being absorbed in the PMT face filter (1). To prevent these rays from causing flare, mirror chamber bisecting blue filters (5) were added and are placed normal to the PMT face filters. These bisecting filters (5) do not extend into the beam scanning area of the mirror chamber to avoid clipping the beam (6) and have a beveled chamfer (7) at the corner near the scan line (8) to minimize disruption of light collection as the spot passes near the edge of the bisecting filters.

The pyramidal mirrors chambers (3) are bounded by PMT filters (1), normal mirror (9) positioned nearly normal to the phosphor (4) surface and parallel to the scan line (8), bottom mirror (10) which also parallels the scan line (8), two top outer mirrors (11), two top inner mirrors (12), two slot mirrors (13), and two end mirrors (14). The left and right pyramidal chambers are joined in the middle of the collector by a triangular passage defined by the abutting edges of top inner mirrors (12), normal mirror (9), and the bottom mirror (10). There is a beam entrance slot (15) that lets the laser beam scan into the mirror chambers. The entrance slot is bounded on one side by normal mirror (9) and on the other by a combination of edges of the inner and outer top mirrors and the two PMT filters. The ends of the slot are bounded by the slot mirrors (13). A collection aperture (16) opposite entrance slot (15) lets the scan beam (6) reach the phosphor (4) and allows blue light emitted from the phosphor and red light reflected from the phosphor to enter the pyramidal mirrors chambers (3). The collection aperture is bounded by normal mirror (9) on one side and bottom mirror (10) on the opposite side. The ends of the collection aperture are defined by end mirrors (14).

As can be seen in FIG. 4, in order to match the mirror chamber PMT apertures (17) to the square configuration of the PMT's, (2) the PMT filter aperture (17) must be square with the corners (18) of the aperture all at 90°. Consequently, planes that outer top mirrors (11) must lie in are determined by the position of PMT filter aperture side (19), the tilt angle of PMT filter aperture (17) relative to mirror (9) and the chosen end point positions (20) of the ends of the top outer side mirrors. The tilt angle of the filters is shown as angle "a" in FIG. 3. The planes that inner top mirrors 12 must lie in are determined by the position of PMT filter aperture side (19), the tilt angle of PMT filter aperture (17) relative to mirror (9) and the chosen end point positions (21) of the ends of the top inner side mirrors.

Because PMT filter aperture (17) is fixed in size and essentially forms a triangle relative to normal mirror (9) and bottom mirror (10), changing the angular position of aperture (17) forces the angular position of bottom mirror (10) to change and limits design options. Another drawback of this triangular cross section becomes evident when trying to design a practical filter/PMT mounting structure to hold the filter along edge (19) to the PMT aperture without intruding on the clearance for scan beam (6).

Figure 5C:
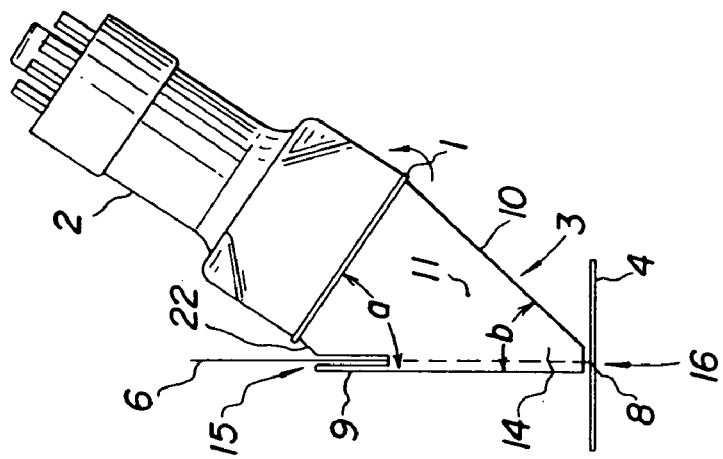
FIGS. 5a, 5b, and 5c are respective side elevational views of other embodiments of the present invention.
Figure 5B:
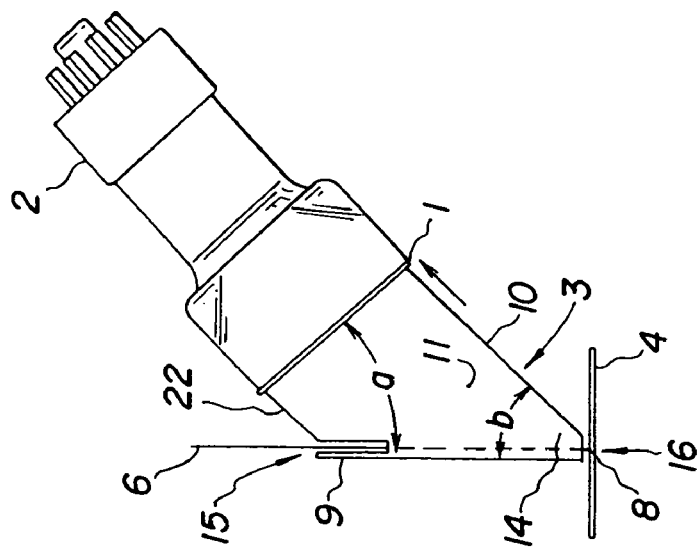
Figure 5A:
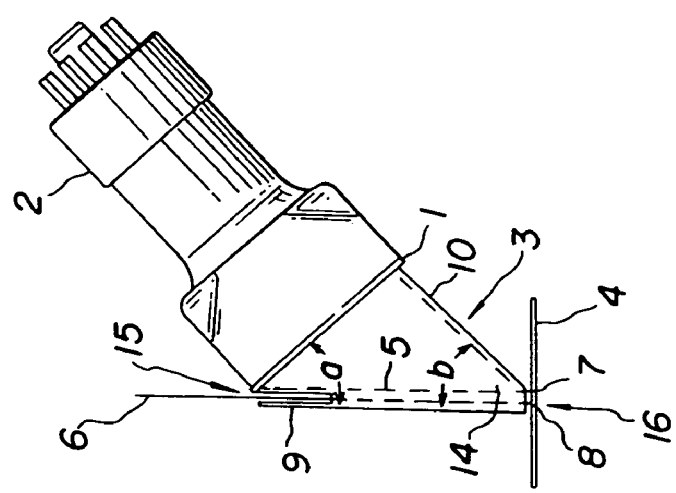

To add geometry modification options to the collector and to provide more filter support and sealing room along edges (19) of the apertures, a top slot mirror (22) was added as shown in FIGS. 5b and 5c.

The addition of top slot mirror (22) allows movement of us to move the PMT (2) back as shown in FIG. 5b and allows rotation of it as shown in FIG. 5c. This allows alteration of angles "a" and "b" independently. Top slot mirror (22) can also be rotated independently. These new degrees of freedom resulted in the identification of geometry options that reduce flare without resorting to bisecting blue filters (5) (FIGS. 3a–3d) that are delicate and have some adverse impact on blue collection efficiency. Another embodiment is shown in FIGS. 6a–6c which include mirror (22).

The same basic mirrors topology shown in FIGS. 6a–6C is incorporated in the embodiment shown in FIGS. 7a–7c to fit the collector into a different envelope constraint. The resulting collection efficiency and flare performance were similar. In both of these embodiments (i.e., FIGS. 6a–6c and FIGS. 7a–7c) flare is controlled at an acceptable level without resorting to the bisecting blue filters used in the embodiment of FIGS. 3a–3d. This is possible because of the shape options the addition of mirrors (22) provides to the pyramidal mirror chamber (3). These chosen geometries ensure that the reflection paths of most rays back to the phosphor (4) include one or more bounces off the blue PMT filter (1) where much of the red light energy gets absorbed.

For flat phosphor screens whose position is well maintained these embodiments provide very satisfactory performance, detecting around 50% of the emitted blue light from the phosphor if the collector spacing from the phosphor is in the 0.2 mm to 1.5 mm elevation range with around a 4% efficiency change over this range. Sudden elevation changes of 0.5 mm could consequently produce density changes in an image that would be detected by the eye. Many phosphor plate transports can have difficulty positioning the phosphor surface with enough accuracy to avoid such shifts. Also, in some cases, the plate extraction mechanisms or lead edge protrusions from the plate require the collection aperture to be spaced several millimeters from the phosphor during part of the plate extraction cycle. An ideal collector would be insensitive to elevation shifts and function with good efficiency when spaced 7 to 10 mm from the phosphor.

FIGS. 8a–8c illustrate the impact that collection aperture size and elevation can have on phosphor emission capture. FIG. 8a shows the Lamertian Energy Output from a phosphor. FIGS. 8b and 8c show that for a given capture angle A-B-C, a narrow mouth collector must be closer to the phosphor at elevation Y1 to collect the same energy as a wide mouth collector does positioned at Y2. Furthermore, an elevation shift of $\Delta Y$ causes a much greater shift in energy capture (shift shown shaded) in a narrow mouth collector (FIG. 8b) than in a wide mouth collector (FIG. 8c).

From a capture angle standpoint a wider mouth is obviously better. Unfortunately, just scaling up the whole collector to increase the width of the entrance aperture would also require larger PMT's. Increasing the entrance aperture at the phosphor while maintaining the same exit aperture at the PMT's tends to reduce the collection efficiency because the resulting change in mirror angles cause more bounces, and more rays get back to the phosphor causing higher flare. To achieve the same collection efficiency with a wide mouth collector at an 8 mm elevation as at a 1.5 mm elevation with the narrow mouth collectors described in FIGS. 3, 6 and 7, specifically designed blue reflecting and red passing dielectric mirrors can be used to control flare and boost blue reflectivity. This allows optimization of the collector geometry strictly on the basis of collection efficiency and manufacturability. A resulting collector that meets the requirements is shown in FIG. 9.

In this design the cross section of the collector mouth has been widened to 19.2 mm from the 6.4 mm used in the previous embodiments. To maintain the beam entrance slot (15) at a constant width all the way across the collector while moving entrance aperture edge (23) away from scan line (8), the normal mirror (9) in FIGS. 3 through 7 has been split into three mirrors: normal mirror, bottom (9a), normal mirror, middle (9b), and normal mirror, top (9c). This keeps normal mirror, top (9c) close to parallel to the scan beam and to the slot edges of top outer mirrors (11). Having mirrors (9a) and (9b) as separate mirrors permits the angle of normal mirror, bottom (9a) to be kept near normal to the phosphor (4) while moved away from scan line (8). This ensures that no first bounce reflections near the lower edge (23) are directed back to the phosphor (4) in cases where the collector is operated at low elevation above the phosphor (4). Mirror (9a) can be angled such that reflections from near its bottom edge (23) are reflected above entrance aperture edge (24) of bottom mirror (10). The angle of mirror, middle (9b) serves to widen the entrance aperture by moving entrance aperture edge (23) away from the scan line (8). A change in the angle of bottom mirror (10) serves to widen the other side of the entrance aperture by moving entrance aperture edge (24) away from scan line (8). The embodiment shown in FIGS. 9a–9c has low sensitivity to phosphor position variations and spaces the collector far enough from the phosphor to avoid having to move part or all of the collector to clear plate extraction mechanisms (not shown).

Figure 10A:
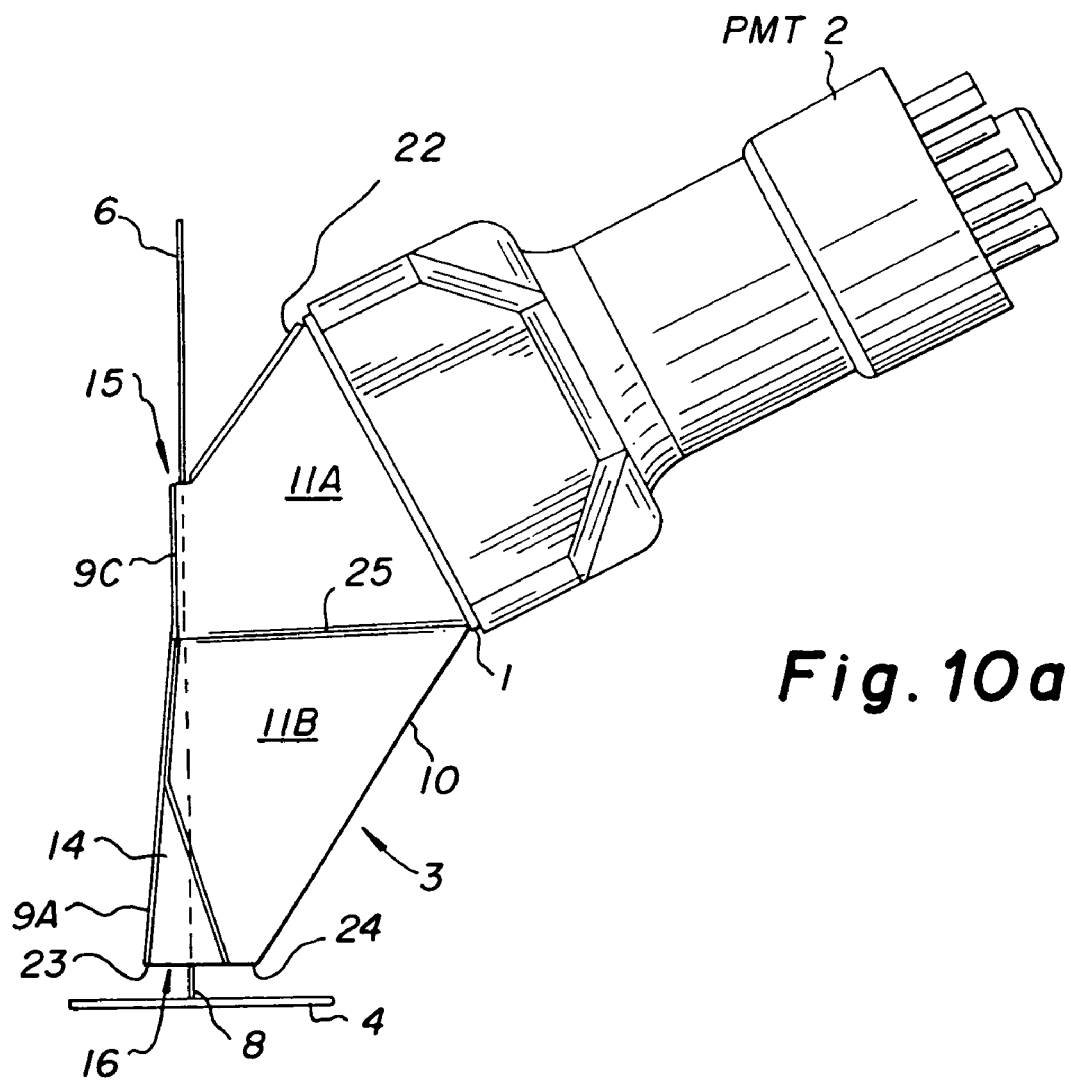
FIGS. 10a, 10b, and 10c are diagrammatic views of another embodiment of the present invention.
Figure 10B:
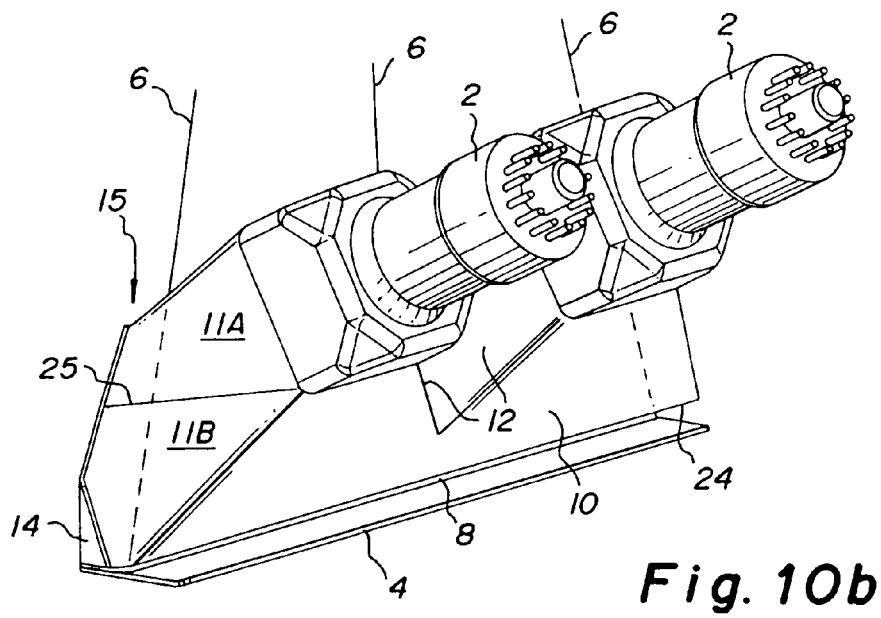
Figure 10C:
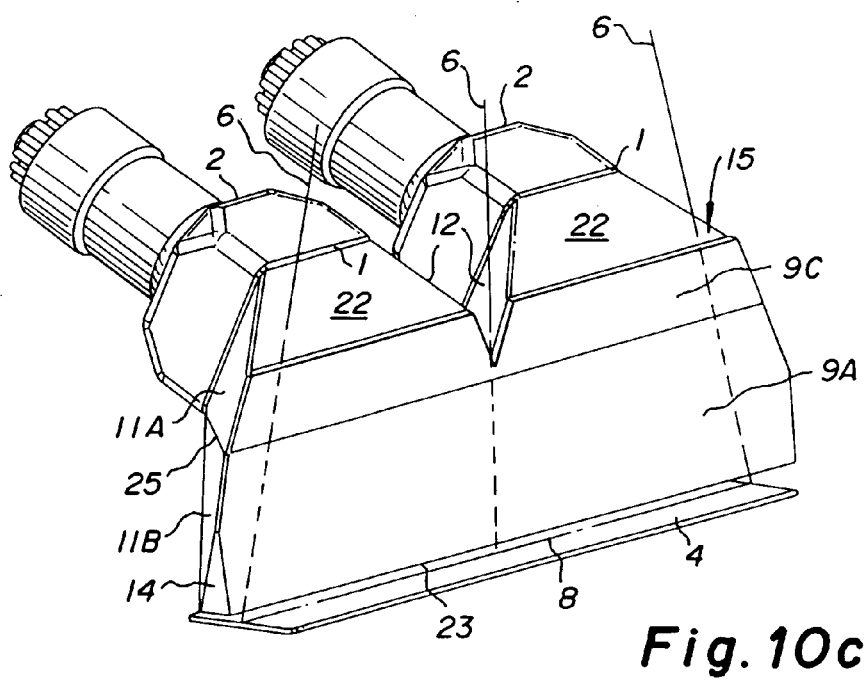

FIGS. 10a–10c show an embodiment of the invention in which the top outer mirrors (11) of FIGS. 9a–9c were split in two and the slot mirrors (13) were combined into the new top outer filter mirrors (11a). The new top outer side mirrors (11b) connect with the top outer filter mirror (11a) by means of a new fold line (25). This new fold line (25) serves as a hinge edge and provides more options for varying the shape of the mirror chamber to keep the ends of the beam entrance slot (15) higher and farther from the scan line (8), thereby reducing emission losses through the entrance slot. The angles between mirrors (11b) and (9a) can become more acute increasing the probability that ray paths from near the ends of scan line (8) to mirror (11b) to mirror (9a) reach the PMT (2) face in two bounces. These factors combine to help bring the ends of the collection efficiency profile up, reducing the collection variability a long the scan line (8). Note also that, in the FIGS. 10a–10c embodiment, mirror middle (9b) is eliminated, bringing the total mirror count down by one. Eliminating mirror(9b) was possible because, if the collector was always going to be used at an elevation of 2.5 mm or more from the phosphor, that would ensure that reflections off normal mirror, bottom (9a) near entrance aperture edge (23) would still reflect above entrance aperture edge (24) even with the tilt from normal that (9a) must assume for the wide aperture without an intermediate (9b) mirror. The width of the collection aperture cross section was set to 21.4 mm. As in prior embodiments described above, the PMT filters (1) are optically coupled to the faces of PMT's (2) to avoid Fresnel losses at the filter/air/PMT interfaces. This can be done with optical cement. The outside face of the filters is also antireflection coated with a coating tuned to pass blue light over a broad range of angles.

The FIGS. 10a–10c embodiment provides a 51% average collection efficiency at an elevation of 8.1 mm from the phosphor with a variation from average ranging from +2% to −1%. At 4.4 mm elevation, the collection efficiency is 58% with similar variability. The flare is maintained at about 0.7% by the use of blue dielectric mirrors for mirrors (11a), (11b) and (9a). The other mirrors in the collector are made using a 3M ESR reflective film. This combination of mirrors is used to keep cost down while achieving needed performance. With the use of all dielectric mirrors we can cut the flare to less than 0.3% and gain 1 to 2% collection efficiency.

In the preferred embodiment mirrors 11a, 11b, 12 and 14 (8 mirrors total) are mounted to the machined faces of a black anodized casting which provides the accurate angular positioning features needed for mounting the mirrors and the PMT tube assemblies and circuit board. Mirrors 9a, 9c, 22 and 10 are mounted to black metal plates which get screwed to the appropriate mounting features on the casting. Top slot mirrors (22) are coplanar and can be made as one continuous mirror or as two separate mirrors.

Figure 11:
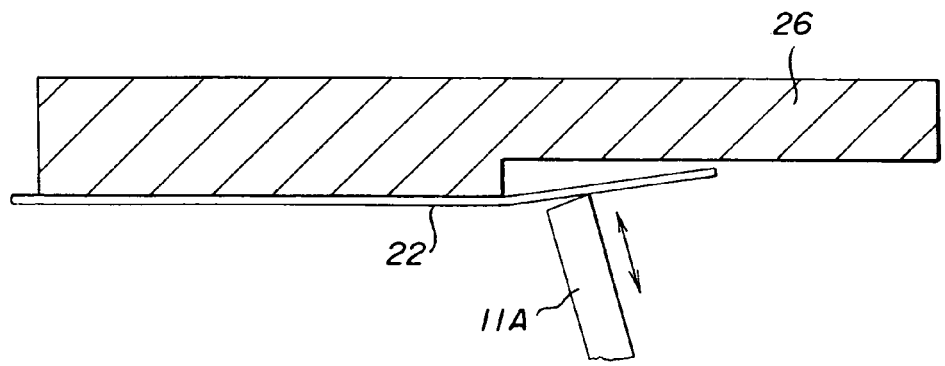
FIG. 11 is a diagrammatic view illustrating contact between rigid and flexible mirrors in the embodiments of the invention.

With the use of 3M ESR reflective film (or other flexible reflector) for mirrors 9c, 10, 12, 14, and 22, gaps between mirrors or between mirrors and PMT filters can be reduced or eliminated by designing the flexible mirror to contact and flex against the mating mirror or filter. This reduces light losses by closing clearance gaps in an inexpensive way. FIG. 11 and FIG. 12 illustrates this technique. FIG. 11 shows the contact of mirrors 11 a and 22 in an embodiment of the collector described in FIG. 10, wherein the top slot mirrors (22) are made of a flexible film such as 3M ESR reflective film and a dielectric glass mirror is used for top outer filter mirrors (11a). The step, which allows the flexible mirror to deflect to accommodate positioning tolerance, can be provided by a stepped mirror support plate (26) as shown in FIG. 11 or by thick double sided adhesive coated foam tape used to mount the overhanging flexible mirror to a flat support plate.

FIG. 12 shows how a flexible mirror can be used for bottom mirror 10 so that mirror (10) can extend up against PMT filter (1) to avoid the need for a clearance gap between mirror 10 and PMT filter (1).

FIG. 12 also shows other PMT mounting details used in an embodiment of the FIG. 10 collector design. These features extend around all four sides of the PMT filter and are shown in FIG. 12 for a cross section of the bottom edge of the filter. Filter (1) overhangs the PMT (2) to which it is cemented with optical cement (27). The filter overhang provides support area on the filter outboard of the edge of the PMT active area (28) to which the edge of chamber mirror, in this bottom case mirror (10), is aligned. Elastomeric filter seat gasket (29) and filter side gasket (30) are attached to PMT filter (1) by means of pressure sensitive adhesive, PSA (31) on the one face of the filter seat gasket (29). The other face of filter seat gasket (29) sits against casting seat (33) to which it is loosely guided by casting PMT well side (35) and pressed by urging force (36) provided by PMT urging structure not shown. Gaskets 29 and 30 avoid stress concentrations between the PMT filter (1) and the collector casting (34) and provide a cushion to reduce the transfer of g-forces to the PMT. Filter seat gasket 29 also provides a light seal to ensure that red scanning light does not leak around the blue PMT filter and provide a false signal to the PMT.

FIG. 12 also shows another feature of filter side gasket (30), which protrudes past the back face of the overhanging PMT filter (1). If the filter seat gasket (29) and filter side gasket (30) are assembled to PMT filter (1) with PSA (31) prior to mounting the PMT (2) to the PMT filter (1), and if the PMT (2) is cemented to the PMT Filter (1) in a PMT face down orientation with optical cement (27), filter side gasket (30) serves as a retaining dike for excess optical cement (37) squeezed out from between the filter (1) and the PMT (2), avoiding the need to wipe off the excess cement from the filter or PMT before it cures.

Figure 13:
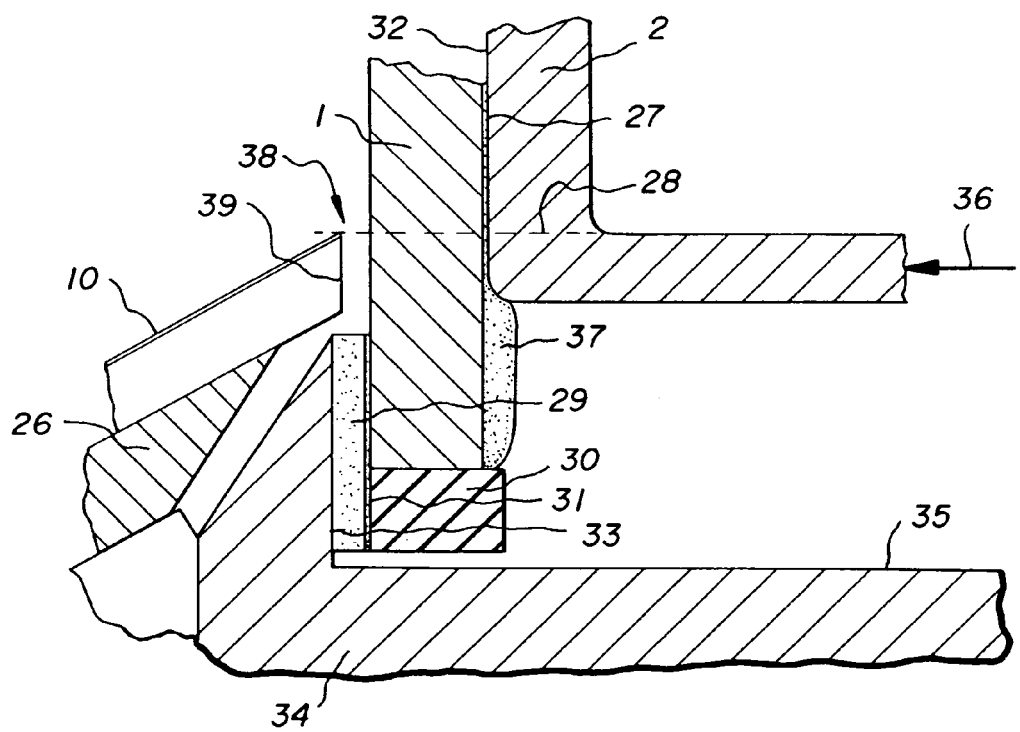

The compressibility of filter seat gasket (29) and the tolerances on the casting, mirror support parts and mirrors ensure that the PMT filter position variability relative to the mirrors surrounding the filter is significant. The flexible mirror shown in FIG. 12 avoids the need for a clearance gap and for beveling adjacent mirrors to minimize the mirror to filter gap. FIG. 13 shows the clearance gap (38) and mirror bevel (39) required with glass mirrors.

Figure 14:
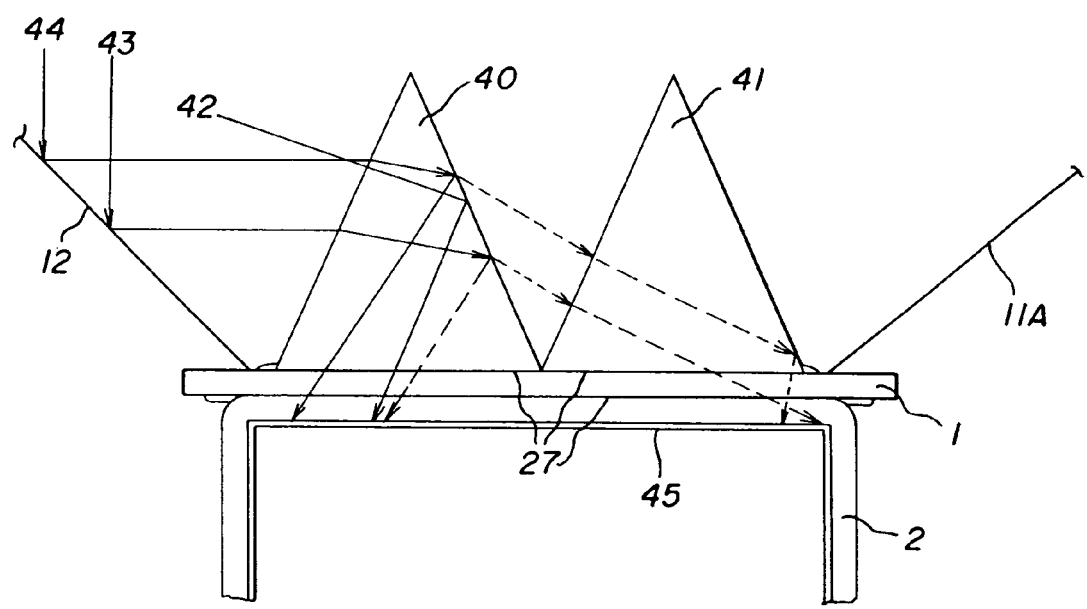
FIG. 14 is a diagrammatic view of another embodiment of the present invention.

In a collector such as shown in FIG. 10 some rays are reflected across the space in front of the PMT without striking and entering the tube. As shown in FIG. 14, by placing prisms such as Prism A (40) and Prism B (41) on the face of the PMT filter (1) some rays which would miss the PMT, such as rays (42), (43) and (44), can be intercepted and directed to the PMT. The addition of double prisms to the PMT filters of this collector design can add 3 to 5% collection efficiency to the collector depending ton the prism design. For this method to work properly the prisms 40 and 41, the PMT filter (1) and the PMT (2) must me optically coupled such as by using optical cement (26) to cement their faces together. This optical coupling is necessary because the prisms allow rays to reach the prism/filter interfaces and the filter/PMT interfaces at angles that exceed the critical angle. This is well illustrated by ray (43) part of which emerges from prism A (40) and enters prism B (41) passing through the filter and reaching the PMT photocathode (45) at approximately 65 degrees from normal. Because the photocathode (45) is close to the same index of refraction as the PMT glass the ray (43) enters the photocathode (45) and is detected.

The invention has been described in detail with particular reference to certain preferred embodiments thereof, but it will be understood that variations and modifications can be effected within the spirit and scope of the invention.

PARTS LIST 1 blue filters
2 PMT's (Photomultiplier Tubes)
3 pyramidal mirror chamber
4 phosphor
5 bisecting blue filters
6 beam
7 beveled chamfer
8 scan line
9 normal mirror
9a normal mirror, bottom
9b mirror, middle
9c normal mirror, top
10 bottom mirror
11 two top outer mirrors
11a two top outer filter mirrors (next to filter—incorporating mirror 13)
11b two top outer side mirrors
12 two top inner mirrors
13 two slot mirrors
14 two end mirrors
15 beam entrance slot
16 collection aperture
17 PMT filter aperture
18 PMT filter aperture corners
19 PMT filter aperture side
20 top outer mirror end points
21 top inner mirror end points
22 top slot mirrors
23 entrance aperture edge (non PMT side)
24 entrance aperture edge (PMT side)
25 mirrors (11a)/(11b) common fold edge
26 mirror support plate
27 optical cement
28 edge of PMT active area
29 filter seat gasket
30 filter side gasket
31 PSA on seat gasket
32 PMT face
33 casting seat
34 collector casting
35 casting PMT well side
36 urging force
37 excess optical cement
38 clearance gap
39 mirror bevel
40 prism A
41 prism B
42 ray
43 ray
44 ray
45 photocathode

What is claimed is:

1. A light collector and detector apparatus for collecting and detecting light emitted, reflected or transmitted by a scanned information medium, comprising:

a planar mirror assembly for extending the width of a scanned information medium and for disposition substantially perpendicular thereto, said planar mirror assembly having a lower edge adjacent to the scanned medium and an upper edge spaced from the lower edge;

first and second pyramidal mirrors located side by side facing said planar mirror, said pyramidal mirrors having respective upper edges spaced from said upper edge of said planar mirror and respective lower edges spaced from said lower edge of said planar mirror, thereby to form aligned upper and lower slots for the passage of a scanning beam of light to a medium to be scanned and for allowing light emitted by, reflected from, or transmitted by the scanned medium to enter the collector;

wherein said first pyramidal mirror has a first aperture in an apex region thereof and wherein said second pyramidal mirror has a second aperture in an apex region thereof;

a first photodetector having a light receiving face coextensive with said aperture of said first pyramidal mirror;

a second photodetector having a light receiving face coextensive with said aperture of said second pyramidal mirror;

wherein light from said scanned medium and reflected by said collector mirrors are received by said light receiving faces of said first and second photodetectors which generate electrical signals in response thereto.

2. The apparatus of claim 1 wherein, in use, said collector is located adjacent to a storage phosphor and wherein a scanning beam of stimulating light is passed through said upper and lower slots of said collector to said storage phosphor and light emitted by said storage phosphor passes through said lower slot into said collector, and including filters covering respectively the face of said first and second photodetectors for only passing emitted light, but not stimulating light to said photodetectors.

3. The apparatus of claim 2 including a filter extending perpendicular to the face of each of said photodetectors, said filters preventing passage of stimulating light to minimize flare.

4. The apparatus of claim 3 wherein said filters are dimensioned so as not to interfere with said scanning beam of light.

5. The apparatus of claim 1 wherein said first and second pyramidal mirrors respectively include a bottom mirror extending the width of said scanned medium and coextensive with each other, an outer mirror extending outwardly from said aperture;

an inner mirror extending inwardly from said aperture; and an end mirror extending from the end of said outer mirror in a direction normal to said scanned medium, said first and second pyramidal mirrors being joined in the middle of said apparatus by the abutting edges of said top inner mirrors and said bottom mirror.

6. The apparatus of claim 5 wherein each said first and second pyramidal mirrors further includes a front mirror extending from said aperture to said upper slot.

7. The apparatus of claim 6 wherein said faces of said first and second photodetectors are planar and oriented at an acute angle relative to said scanned medium.

8. The apparatus of claim 6 wherein said faces of said first and second photodetectors are planar and oriented substantially parallel to said scanned medium.

9. The apparatus of claim 1 wherein said faces of said first and second photodetectors are substantially square and wherein said apertures of said pyramidal mirrors are substantially square to match said substantially square faces of said first and second photodetectors.

10. The apparatus of claim 9 wherein said first and second photodetectors have edges which are coextensive with said upper slot.

11. The apparatus of claim 1 wherein said lower slot is substantially wider than said upper slot.

12. The apparatus of claim 11 wherein said planar mirror is segmented into an upper segment normal to said scanned medium, a middle segment angled relative to said scanned medium, and a lower segment normal to said scanned medium.

13. The apparatus of claim 11 wherein said planar mirror is segmented into an upper segment normal to said scanned medium and a lower segment angled relative to said scanned medium and wherein said respective outer mirrors of said first and second pyramidal mirrors are segmented into upper and lower segments.

14. The apparatus of claim 13 wherein one or more of said bottom, inner and outer mirrors of said first and second pyramidal mirrors are flexible.

* * * * *